United States Patent [19]
Okino

[11] Patent Number: 5,311,322
[45] Date of Patent: May 10, 1994

[54] VIDEO CAMERA WITH NEGATIVE-POSITIVE REVERSAL FUNCTION

[75] Inventor: Tadashi Okino, Yokohama, Japan

[73] Assignee: Canon Kabushiki Kaisha, Tokyo, Japan

[21] Appl. No.: 738,890

[22] Filed: Aug. 1, 1991

[51] Int. Cl.$^5$ .................. H04N 9/04; H04N 9/64; H04N 5/238

[52] U.S. Cl. ..................... 348/223; 348/363

[58] Field of Search ............... 358/41, 44, 29, 296, 358/47, 54, 214, 215, 209, 210, 227, 228; H04N 9/04, 9/07, 9/64, 5/232, 5/238

[56] References Cited

U.S. PATENT DOCUMENTS

| | | | |
|---|---|---|---|
| 4,608,595 | 8/1986 | Nakayama et al. | 358/296 |
| 4,703,360 | 10/1987 | Shor | 358/214 |
| 4,771,343 | 9/1988 | Takenaka | 358/54 |
| 4,866,513 | 9/1989 | Takahashi | 358/54 |

Primary Examiner—James J. Groody
Assistant Examiner—Michael H. Lee
Attorney, Agent, or Firm—Morgan & Finnegan

[57] ABSTRACT

A video camera including: an image pickup unit for generating an image signal; a level changing device for changing the level of the image signal; a negative-positive switching circuit for receiving the image signal outputted from the level changing device, the negative-positive switching circuit outputting the image signal outputted from the level changing device after inverting the level change direction of the image signal in a negative mode, and outputting the image signal outputted from the level changing device without inverting the level change direction of the image signal in a positive mode; and a control circuit for controlling the level changing device, the control circuit inverting the control direction between the negative and positive modes. The same control for both the negative image pickup and positive image pickup can be carried out by similar processes and operations.

33 Claims, 8 Drawing Sheets

VIDEO CAMERA WITH NEGATIVE-POSITIVE REVERSAL FUNCTION

BACKGROUND OF THE INVENTION

1. Field of the Invention

The present invention relates to a video camera, and more particularly to a video camera having a negative-positive reversal function.

2. Related Background Art

FIG. 1 is a block diagram showing the outline of the structure of a conventional television camera of this type having an iris control function. In FIG. 1, reference numeral 1 represents light from a subject (not shown). This light 1 passes through a lens 2 and iris 3 and becomes incident on an image pickup unit 4 whereat the light is photoelectrically converted into an image signal Y and outputted therefrom. The image signal Y is divided into a negative signal ($\overline{Y}$) and a positive signal (Y) at a negative-positive inverter 5 which are then sent to a negative-positive switch unit 6. Reference numeral 5a represents an inverter amplifier. The negative-positive switch unit has a switch 6a which is switched under control of a negative-positive control signal (NP Cont). One of the negative and positive signals selected by the switch 6a is sent to a signal processing unit 7 and outputted therefrom as a video (Video) signal after having been processed.

In the meantime, a fraction of the image signal Y outputted from the image pickup unit 4 is sent to an iris control unit 8 whereat the image signal Y is adjusted to have a proper level and outputted to an iris driving unit 9. The iris driving unit 9 drives the iris 3 to control the light amount incident upon the image pickup unit 4. These units constitute an automatic iris control system.

The iris control unit 8 is constructed such that the image signal Y is controlled to have a proper level in accordance with an iris control signal (Iris Cont) supplied from an iris control signal generating circuit 17. The iris control signal Iris Cont can be adjusted externally by an operator by manipulating a manual volume 18, to thereby obtain a desired opening degree of the iris 3.

The conventional television camera described above, however, has a problem of poor handling in operation that the direction (polarity) of brightness change during iris adjustment is reversed between a mode of outputting a negative signal (hereinafter called a negative mode) and a mode of outputting a positive signal (hereinafter called a positive mode), resulting in a different way of adjustment between the negative mode and positive mode.

Specifically, in manipulating the manual volume 18 to supply an iris control signal and externally adjust the opening degree of the iris, the direction of brightness change of a video output signal is reversed between a positive mode image pickup and a negative mode image pickup. For example, in the positive mode, the iris is opened to make an image bright, whereas in the negative mode an image becomes dark if the iris is opened.

The reason for this will be described briefly. As the iris is opened in the positive mode, it is apparent that the image signal Y becomes stronger and the image becomes brighter. In the negative mode, the inverted negative signal $\overline{Y}$ is given by the following equation.

$$\overline{Y} = A - Y \qquad (1)$$

where A is a constant. Therefore, as the iris is opened in the negative mode to make an image bright, the positive signal Y becomes stronger and so the negative signal $\overline{Y}$ becomes weaker, as understood from the equation (1). Thus, the relation between the direction of opening the iris and the image brightness is reversed between the negative and positive modes.

FIG. 2 is a block diagram showing the circuit arrangement of a conventional television camera of the type described above, having a white balance control function. In FIG. 2, reference numeral 21 represents an image pickup unit for photoelectrically converting light from a subject (not shown) into color signals $E_R'$, $E_G'$, and $E_B'$ respectively of red (R), green (G), and blue (B) colors. Reference numeral 22 represents an amplifier unit having amplifiers 22a, 22b, and 22c for amplifying the color signals $E_R'$, $E_G'$, and $E_B'$. The amplifiers 22a and 22c are voltage-controlled variable gain amplifiers, whose gains are controlled by control voltages $V_R$ and $V_B$ or white balance control information supplied from a white balance control signal generating circuit 38. Reference numeral 23 represents a signal processing unit which processes (gamma correction and the like) the amplified color signals $E_R$, $E_G$, and $E_B$ and outputs image signals including a luminance signal $E_Y$ and color difference signals $E_{R-Y}$ and $E_{B-Y}$. Reference numeral 24 represents an inverter unit having inverters 24a, 24b, and 24c for inverting the image signals. Reference numeral 25 represents a negative-positive switching unit for selectively using the inverted image signal (negative signal) and non-inverted image signal (positive signal) between the negative and positive modes, the negative-positive switching unit having switches 25a, 25b, and 25c which are controlled by a negative-positive control signal (NP CONT) supplied from a negative-positive switching signal generating circuit 36. Reference numeral 26 represents an encoder for converting the image signals into a video signal (Video) and outputting therefrom. Reference numeral 37 represents a manual volume for adjusting white balance control signals $V_R$ and $V_B$.

The operation of the color television camera constructed as above will be described. Light from a subject is photoelectrically converted into R, G, and B color signals $E_R'$, $E_G'$, and $E_B'$, which are amplified by the amplifiers 22a, 22b, and 22c and sent to the signal processing unit 23. The amplifiers 22a and 22c are voltage-controlled variable gain amplifiers, as described previously, and the gains thereof are controlled by the control voltages $V_R$ and $V_B$ to obtain a proper white balance. The signal processing unit 23 processes the color signals $E_R$, $E_G$, and $E_B$ and converts them into a luminance signal $E_Y$ and color difference signals $E_{R-Y}$ and $E_{B-Y}$. These image signals outputted from the signal processing unit 23 pass through the inverter unit 24 and negative-positive switching unit 25 and are sent to the encoder 26 whereby they are converted into a video signal to be outputted therefrom.

The inverter unit 24 has inverters 24a, 24b, and 24c for respective signals $E_Y$, $E_{R-Y}$, and $E_{B-Y}$, the interconnection between the switches 25a, 25b, and 25c of the negative-positive switching unit 25 being as shown in FIG. 2. As described above, the negative-positive switching unit 25 is controlled by the negative-positive control signal (NP CONT) supplied from the negative-positive switching signal generating circuit 36, to thereby activate the switches 25a, 25b, and 25c and selectively use the negative and positive signals. The inverters 24b and 24c for the color difference signals operate in the manner defined by the following equations.

$$E_{\overline{R-Y}} = -E_{R-Y} \\ E_{\overline{B-Y}} = -E_{B-Y}$$  (I)

The inverter 24a for the luminance signal operates in the manner defined by the following equation.

$$E_{\overline{Y}} = A - E_Y$$  (II)

where A is a constant.

The operation of the white balance control by the circuit shown in FIG. 2 will be briefly described for the positive mode and for the negative mode.

(A) The case will be described wherein in the positive mode, the white balance control voltages $V_R$ and $V_B$ are adjusted by the manual volume 37 to increase the gain of the amplifier 22a and decrease the gain of the amplifier 22c.

In this case, it is apparent that as the gain of the amplifier 22a is increased, the level of the R signal $E_R$ will rise, and that as the gain of the amplifier 22c is decreased, the level of the B signal $E_B$ will lower. In accordance with the obtained color signals, the luminance signal $E_Y$ and color difference signals $E_{R-Y}$ and $E_{B-Y}$ are generated and encoded. As a result, an image more reddish than that before the gain change is displayed on the screen of a monitor (not shown).

(B) Next, the case will be described wherein in the negative mode, the white balance control voltages $V_R$ and $V_B$ are adjusted by the manual volume 37 to increase the gain of the amplifier 22a and decrease the gain of the amplifier 22c.

In this case, it is apparent that as the gain of the amplifier 22a is increased, the level of the R signal $E_R$ will rise, and that as the gain of the amplifier 22c is decreased, the level of the B signal $E_B$ will lower. In accordance with the obtained color signals, the luminance signal $E_Y$ and color difference signals $E_{R-Y}$ and $E_{B-Y}$ are generated, inverted and encoded. As a result, an image more bluish than that before the gain change is displayed on the screen of a monitor (not shown).

Next, the operation of the white balance control in the above case (A) will be described in more detail. For the purpose of simplicity, it is assumed that luminance and color difference matrices in conformity with the NTSC system are ideal.

The conversion of color signals $E_R$, $E_G$, and $E_B$ into color signals $E_Y$, $E_{R-Y}$, and $E_{B-Y}$ is carried out using the following equations.

$$E_Y = 0.3E_R + 0.59E_G + 0.11E_B \\ E_{R-Y} = 0.7E_R - 0.59E_G - 0.11E_B \\ E_{B-Y} = -0.3E_R - 0.59E_G + 0.11E_B$$  (III)

The inverted image signals are given by the following equations.

$$E_{\overline{Y}} = A - (0.3E_R + 0.59E_G + 0.11E_B) \\ E_{\overline{R-Y}} = -(0.7E_R - 0.59E_G - 0.11E_B)$$  (IV)

-continued
$$E_{\overline{B-Y}} = -(-0.3E_R - 0.59E_G + 0.11E_B)$$

The reproduced signals at the monitor are given by the following equations.

$$E_{Rm} = E_Y + E_{R-Y} \\ E_{Bm} = E_Y + E_{B-Y} \\ E_{Gm} = E_Y - \frac{0.3}{0.59} E_{R-Y} - \frac{0.11}{0.59} E_{B-Y}$$  (V)

where $E_{Rm}$ is a red channel signal at the monitor, $E_{Gm}$ is a green channel signal at the monitor, and $E_{Bm}$ is a blue channel signal at the monitor.

From the equations (IV) and (V), the reproduced signals at the monitor during the negative mode are given by the following equations.

$$E_{Rm} = E_{\overline{Y}} + E_{\overline{R-Y}} = A - E_R \\ E_{Gm} = E_{\overline{Y}} - \frac{0.3}{0.59} E_{R-Y} - \frac{0.11}{0.59} E_{\overline{B-Y}} = A - E_G \\ E_{Bm} = E_{\overline{Y}} + E_{B-Y} A - E_B$$  (VI)

Accordingly, as the R signal $E_R$ level is raised at the amplifier 22a, the signal $E_{Rm}$ at the monitor becomes weaker, and as the B signal $E_B$ level is lowered at the amplifier 22c, the signal $E_{Bm}$ at the monitor becomes stronger. In other words, an image on the monitor becomes bluish. This is because a reversal function of image signals is provided at the succeeding stage of the white balance controlling variable gain amplifiers.

A conventional color television camera having a negative-positive reversal function and a white balance control function is constructed as described above. Therefore, the operation of the white balance control is reversed between the negative and positive modes. In adjusting a white balance slightly by manipulating the manual volume 37, the control operation is reversed between the negative and positive modes, resulting in poor handling in operation. A color television camera, particularly a camera having a single manual volume for adjusting an image to become reddish or bluish, the rotation direction is reversed, resulting in disability of adjustment in some cases.

SUMMARY OF THE INVENTION

It is an object of the present invention to solve the above-described problems associated with conventional video camera.

It is another object of the present invention to provide a video camera having a negative-positive reversal function, capable of adjusting an output video signal in the same manner for both the negative and positive image pickup modes.

In consideration of the above objects, according to one aspect of the present invention, there is provided a video camera comprising:

(a) image pickup means for generating an image signal;

(b) level changing means for changing the level of the image signal;

(c) negative-positive switching means for receiving the image signal outputted from the level changing means, the negative-positive switching means outputting the image signal outputted from the level changing means after inverting the level change direction of the image signal in a negative mode, and outputting the image signal outputted from the level changing means without inverting the level change direction of the image signal in a positive mode; and (d) control means for controlling the level changing means, the control means inverting the control direction between the negative and positive modes.

It is a further object of the present invention to provide a video camera having a negative-positive reversal function, capable of adjusting the iris in the same manner for both the negative and positive image pickup modes.

In consideration of the above object, according to another aspect of the present invention, there is provided a video camera comprising:

(a) image pickup means for converting light from a subject into an electrical image signal;

(b) an iris for limiting the subject image signal incident upon the image pickup means;

(c) negative-positive switching means for receiving the image signal, the negative-positive switching means outputting the image signal after inverting the level change direction of the image signal in a negative mode, and outputting the image signal without inverting the level change direction of the image signal in a positive mode; and (d) control means for controlling the iris, the control means inverting the control direction between the negative and positive modes.

It is a still further object of the present invention to provide a video camera having a negative-positive reversal function, capable of controlling a white balance in the same manner for both the negative and positive image pickup modes.

The above and other objects, and advantages of the present invention will become apparent from the following detailed description of preferred embodiments when read in conjunction with the accompanying drawings.

DETAILED DESCRIPTION OF THE PREFERRED EMBODIMENTS

Figure 1:
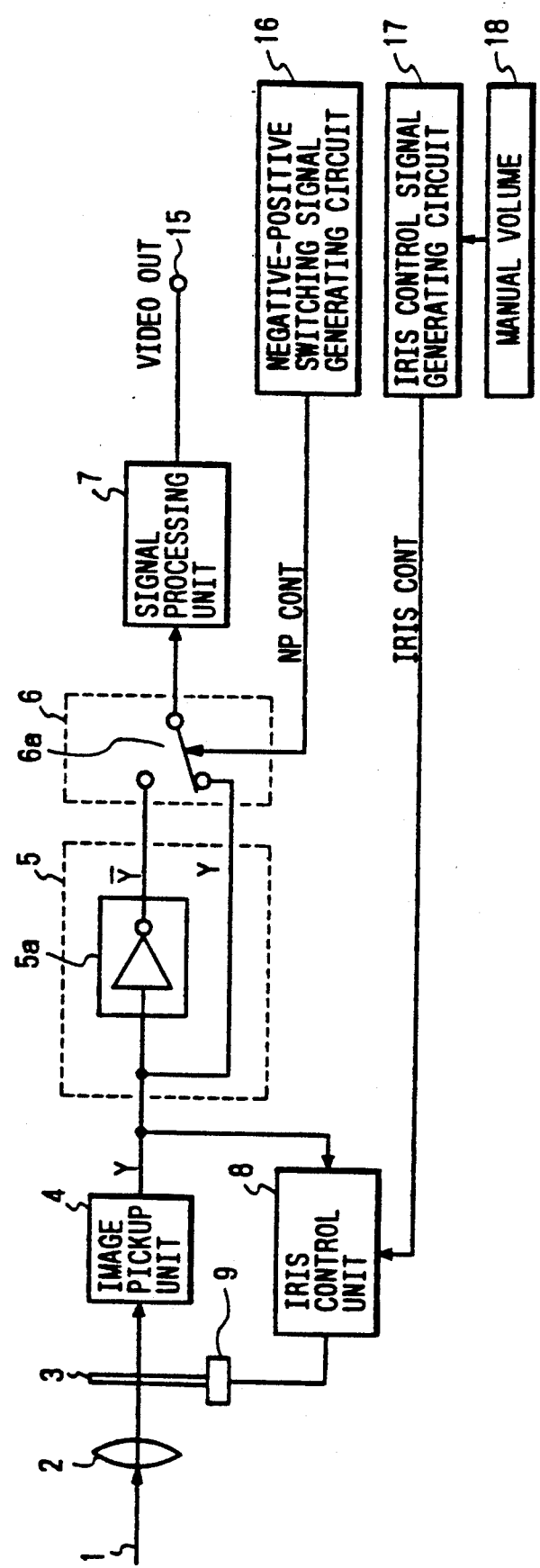
FIG. 1 is a block diagram showing the outline of the structure of a conventional video camera having a negative-positive reversal function and an iris control function.
Figure 3:
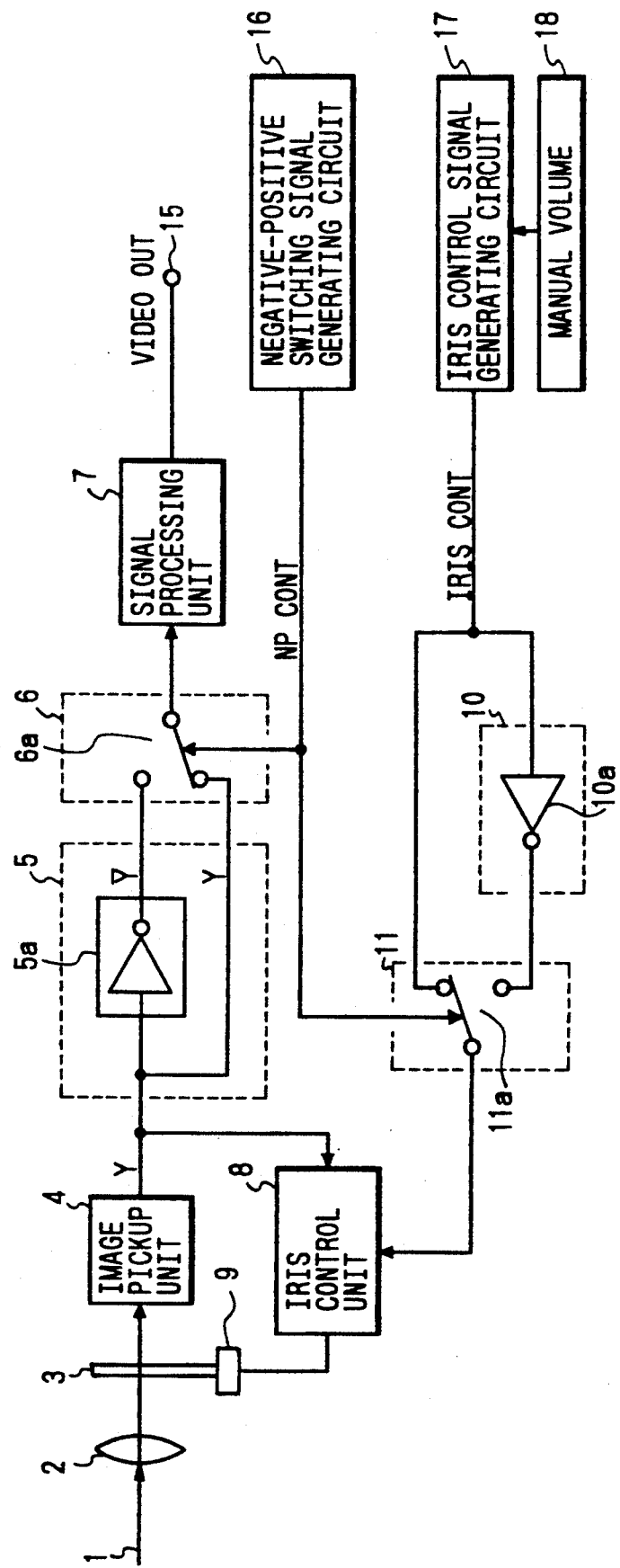
FIG. 3 is a diagram showing a video camera having an iris control function according to an embodiment of the present invention.

FIG. 3 is a block diagram showing the structure of a video camera having an iris control function according to an embodiment of the present invention. Like elements to those shown in FIG. 1 are represented by using identical reference numerals. Reference numeral 1 represents light from a subject, 2 represents a lens, and 3 represents an iris for controlling a light amount incident upon an image pickup unit 4. Image pickup elements of the image pickup unit 4 photoelectrically convert the subject light into an image signal Y. Reference numeral 5 represents a negative-positive inverter unit for negative-positive reversal of the image signal Y. Reference numeral 6 represents a negative-positive switching unit for selectively using the inverted negative signal $\overline{Y}$ and a non-inverted positive signal Y, under control of a negative-positive control signal (NP Cont) supplied from a negative-positive switching signal generating circuit 16. Reference signal 7 represents a signal processing unit for generating a video signal. Reference numeral 8 represents an iris control unit for outputting an iris control signal to an iris driving unit 9 which drives the iris 3. Reference numeral 10 represents a control signal polarity inverter unit for inverting the polarity of an iris control signal Iris Cont supplied from an iris control signal generating circuit 17. Reference signal 11 represents a control signal switching unit for selectively using the inverted signal and non-inverted signal of the control signal Iris Cont between the negative and positive modes, under control of a negative-positive control signal (NP Cont), the switching unit operating together with the negative-positive switching unit. Reference numeral 18 represents a manual volume for controlling the iris by externally adjusting the iris control signal.

The operation of the video camera constructed as above will be described.

Switches 6a and 11a of the switching units 6 and 11 are actuated by the negative-positive control signal between the negative and positive modes, to select ones of the inputted signals. As the manual volume 18 is moved to slightly change the iris control signal and open the iris in order to make an image bright in the negative mode, the control signal switching unit 11 outputs the inverted iris control signal, so that the iris 3 is moved toward the close state. As a result, the signal Y weakens as understood from the equation (1), and the signal $\overline{Y}$ beomes strong-making the image bright as the operator intends.

In this manner, the iris adjustment or subject brightness can be performed in the same manner for both the negative and positive modes, thereby providing good handling in operation and high quality of the video camera.

The control signal polarity inverter 10 may have, if necessary, a desired control characteristic. For example, the rate in change of opening and closing the iris may be changed between the negative and positive modes. The proper center value of the opening degree of the iris may be changed between the negative and positive modes.

Figure 4:
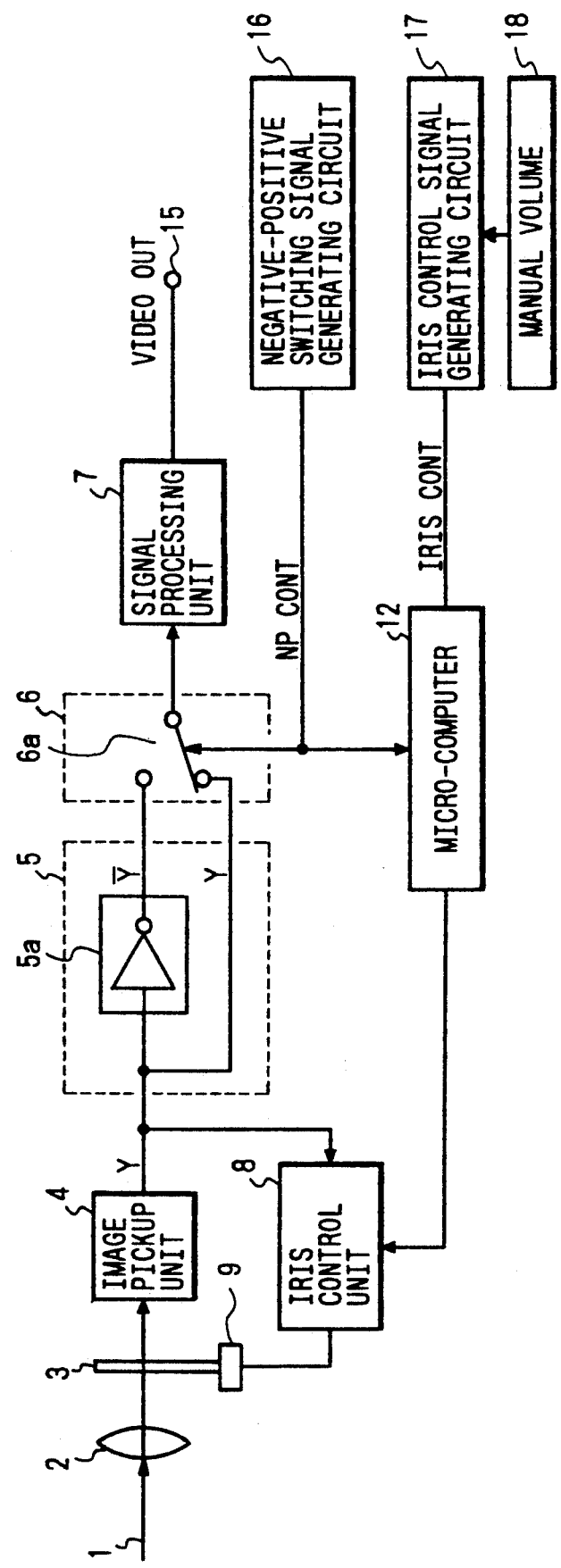
FIG. 4 is a diagram showing a modification of the video camera shown in FIG. 3.

FIG. 4 is a block diagram showing the structure of a video camera which is a modification of the video camera shown in FIG. 3. Although the inversion and switching of an iris control signal is effected by hardware in the embodiment shown in FIG. 3, it is effected by software in this embodiment. In this embodiment, a microcomputer 12 is used for realizing the functions of the control signal polarity inverter unit 10 and control signal switching unit 11. Even with such an arrangement, similar operation and effect to the embodiment shown in FIG. 3 can be obtained.

Figure 5:
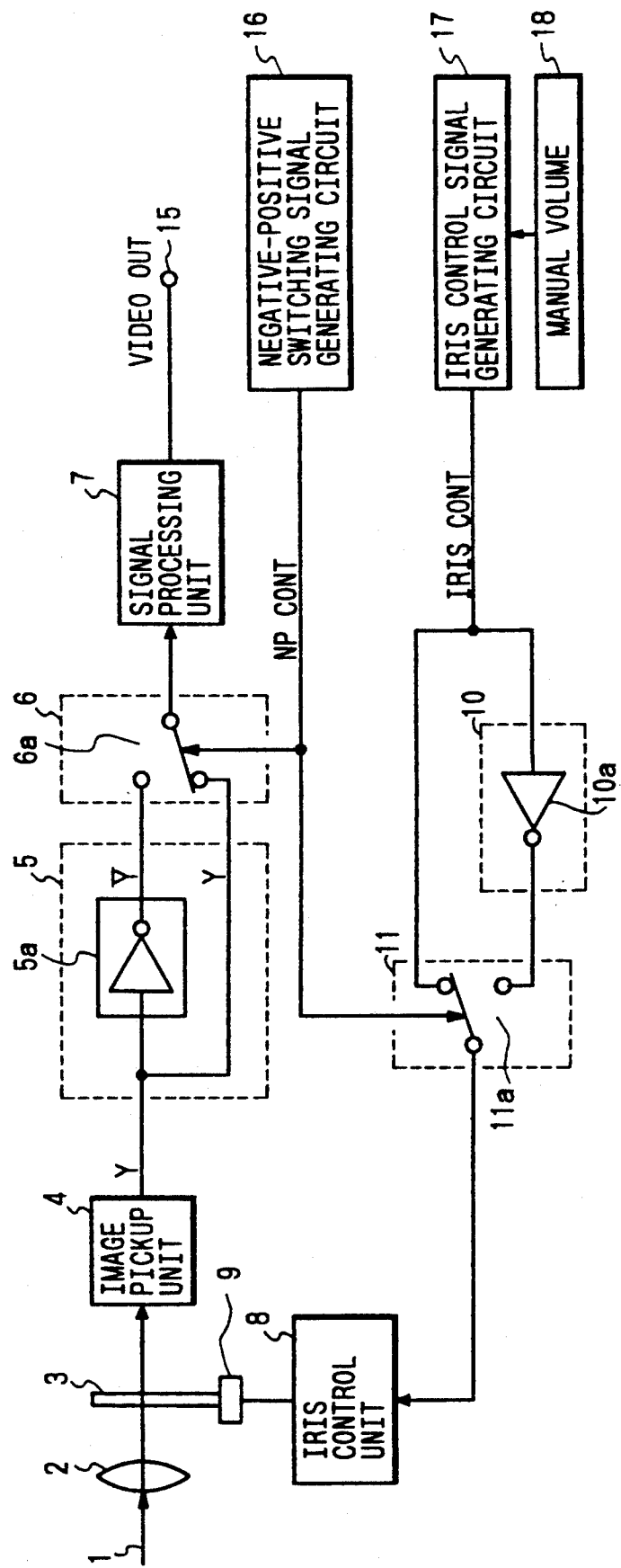
FIG. 5 is a diagram showing a modification of the video camera shown in FIG. 4.

FIG. 5 is a block diagram showing another modification of the video camera shown in FIG. 3. In the embodiments shown in FIGS. 3 and 4, there has been described the automatic iris control system which feedback controls the opening degree of the iris. In this embodiment, there is not provided an automatic iris control loop, but the opening degree of the iris is controlled externally only the manual volume 18. This embodiment also obtains the same effect at that of the above-described embodiments.

A monochrome video television has been described in the above embodiments, for the purpose of description simplicity. The present invention is not limited only to a monochrome video camera, but it is also applicable to a color video camera having an iris control function.

As described above, according to the embodiments shown in FIGS. 3 to 5, the polarity of the iris control signal is changed between the negative and positive modes. Therefore, the direction of operating an iris adjustment and subject brightness adjustment becomes same for both the negative and positive modes, improving handling in operation.

Figure 2:
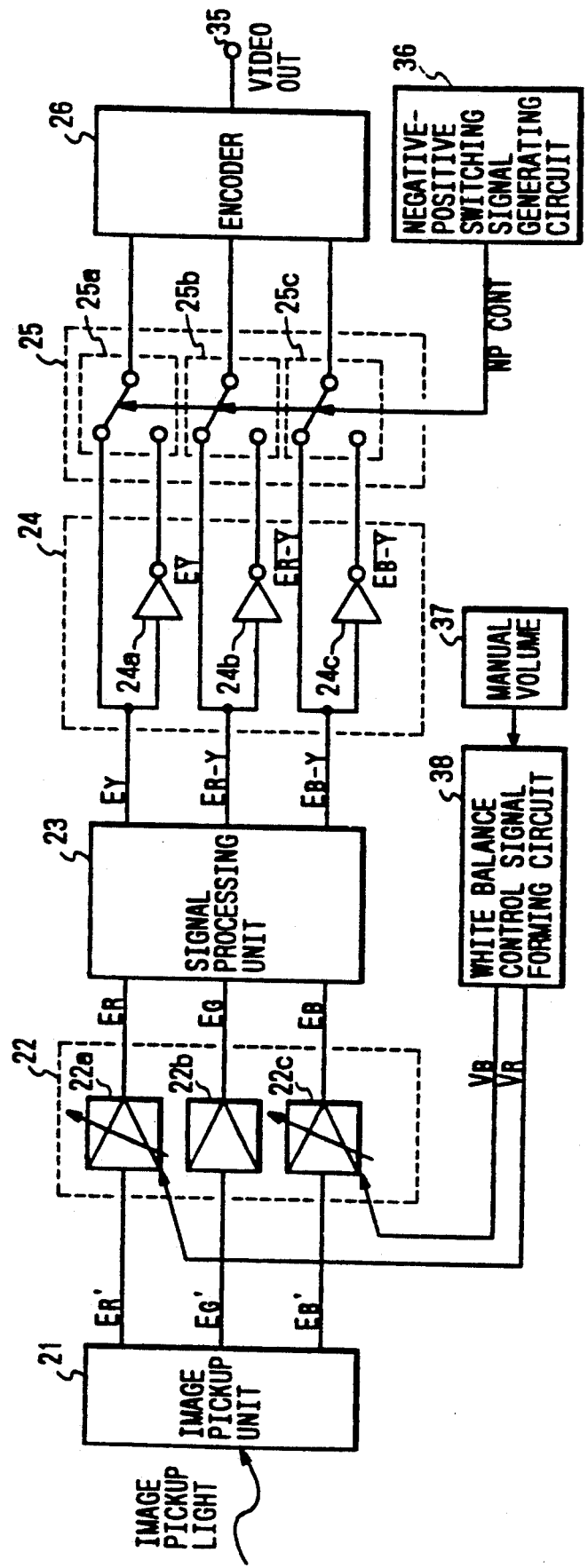
FIG. 2 is a block diagram showing the outline of the structure of a conventional video camera having a negative-positive reversal function and a white balance function.
Figure 6:
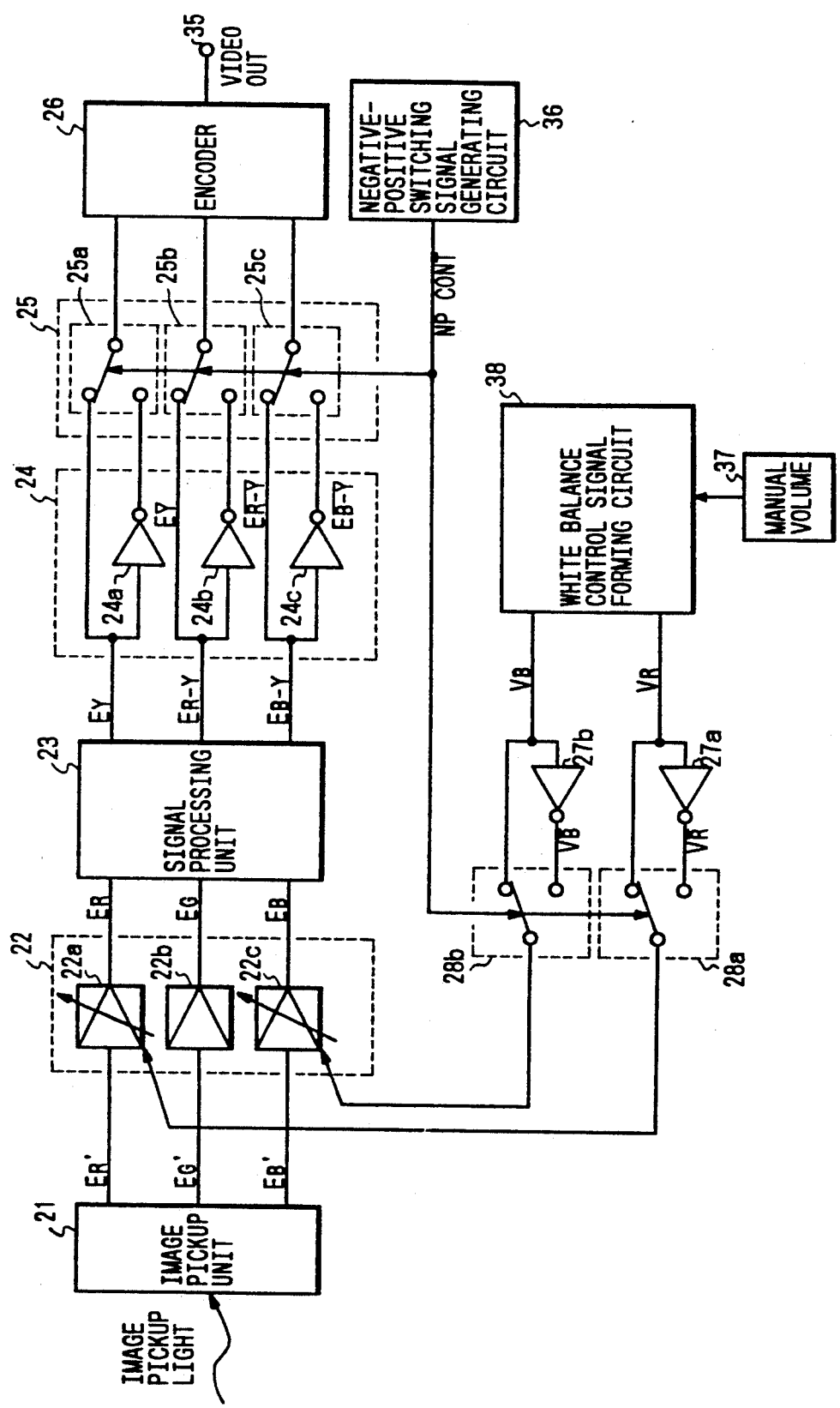
FIG. 6 is a diagram showing a video camera having a white balance control function, embodying the present invention.

FIG. 6 shows the circuit arrangement of a video camera having a white balance control function according to an embodiment of the present invention. Like elements to those shown in FIG. 2 are represented by using identical reference numerals, and the duplicated, detailed description is omitted. In FIG. 6, reference numerals 27a and 27b represent inverters for inverting the polarities of control voltages (white balance control information) $V_R$ and $V_B$ supplied from the white balance control signal generating circuit 38. Reference numerals 28a and 28b represent control voltage switching units for selectively using inverted control voltages $\overline{V_R}$ and $\overline{V_B}$ and non-inverted control voltages $V_R$ and $V_B$. The voltage switching units 28a and 28b are controlled by a negative-positive control signal (NP CONT) supplied from a negative-positive switching signal generating circuit 36, and operates together with switches 25a, 25b, and 25c of the negative-positive switching unit 25. Reference numeral 37 represents a manual volume for externally adjusting the control voltages $\overline{V_R}$ and $\overline{V_B}$.

In the video camera with the above circuit arrangement, the direction (polarity) of control voltage change of the variable gain amplifiers for the white balance control is reversed between the negative and positive modes. However, provision of the inverters 27a and 27b and the switching units 28a and 28b enables to make the direction of white balance change same for both the negative and positive modes. For example, by selecting a proper ratio between inversion gains and proper absolute gain values of the control voltage inverters 27a and 27b in the negative mode shown in FIG. 6, it becomes possible to determine the degree of change in controlling a white balance in the negative mode, i.e., the degree of reddish or bluish or color hue.

In this manner, there is provided a function to reverse the direction of change in controlling a white balance. Therefore, a white balance can be adjusted in the same manner both for the negative and positive modes, providing good handling in operation and the good quality of the video camera.

Figure 7:
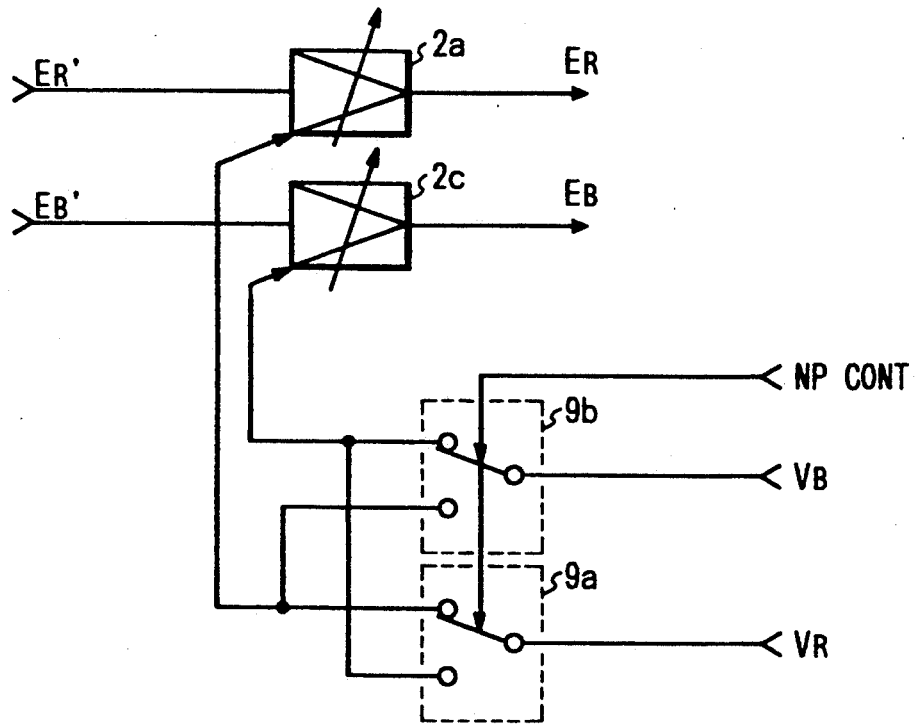
FIG. 7 is a diagram showing a modification of the video camera shown in FIG. 6.

FIG. 7 shows the circuit arrangement of a modification of the video camera shown in FIG. 6, with only the control system for variable gain amplifiers being illustrated. The other arrangement is the same as that shown in FIG. 6. Reference numerals 29a and 29b represent control voltage switching units.

An optimum gain for a white balance changes with the color temperature of a subject light. The optimum gain changes such that as the gain for R signal is increased, the gain for B signal decreases. Therefore, with the circuit arrangement shown in FIG. 7, the same effect as the above embodiments can be obtained. In the circuit shown in FIG. 7, the control voltage switching unit 29a operates such that in the positive mode, a control voltage $V_R$ is supplied to an R channel amplifier 22a, and in the negative mode, it is supplied to a B channel amplifier 22c. The control voltage switching unit 29b operates such that in the positive mode, a control voltage $V_B$ is supplied to the B channel amplifier 22c, and in the positive mode, it is supplied to the R channel amplifier 22a.

Figure 8:
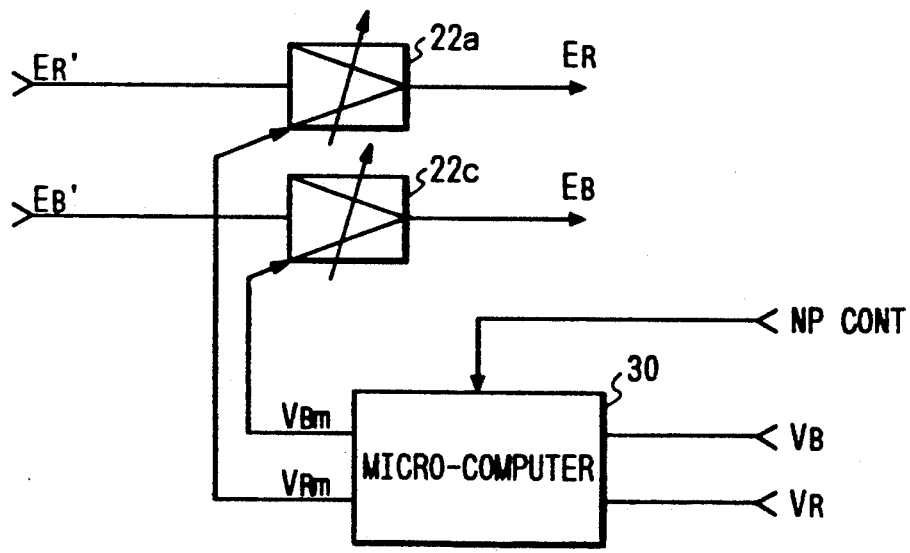
FIG. 8 is a diagram showing another modification of the video camera shown in FIG. 6.

FIG. 8 shows a circuit arrangement of another modification of the video camera shown in FIG. 6. In the above-described embodiments, the function of inversion and switching of the white balance control information is realized by hardware. In this embodiment, it is realized by software. Specifically, control voltages $V_R$ and $V_B$ are temporarily inputted to a microcomputer 30 which in turn outputs the control voltages $V_R$ and $V_B$ by inverting the polarities in accordance with the current negative or positive mode. With such a circuit arrangement, similar operation and effect to those shown in FIGS. 6 and 7 can be obtained.

Figure 9:
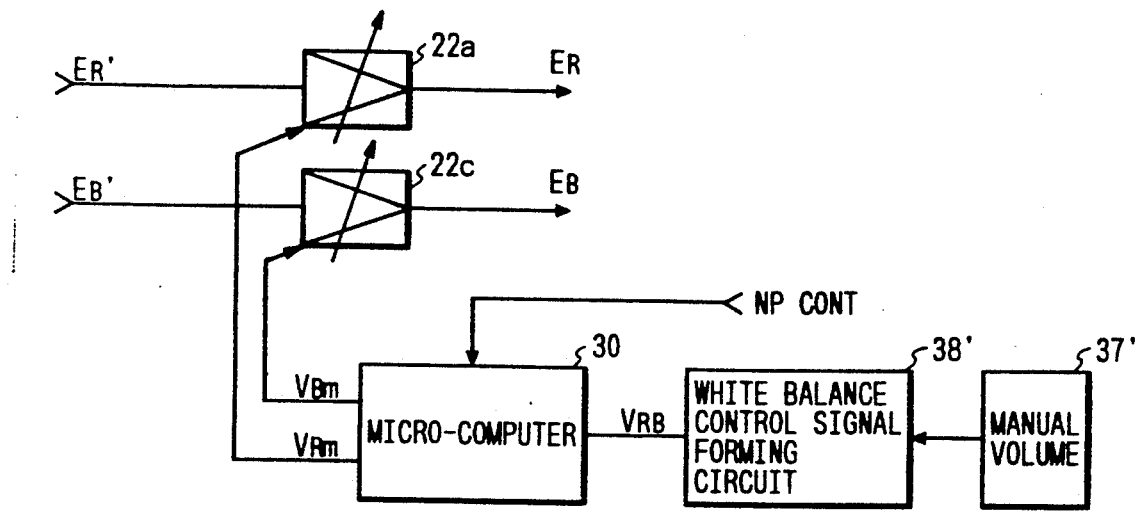
FIG. 9 is a diagram showing a further modification of the video camera shown in FIG. 6.

FIG. 9 shows a circuit arrangement of a further modification of the video camera shown in FIG. 6. Although the independent two control voltages $V_R$ and $V_B$ are supplied in the above-described embodiments, this embodiment uses one control voltage $V_{RB}$. The control voltage $V_{RB}$ adjustable by a manual volume 37° is supplied from a white balance control signal generating circuit 38' to a microcomputer 30 which in turn generates two control voltages $V_{Rm}$ and $V_{Bm}$.

Figure 10:
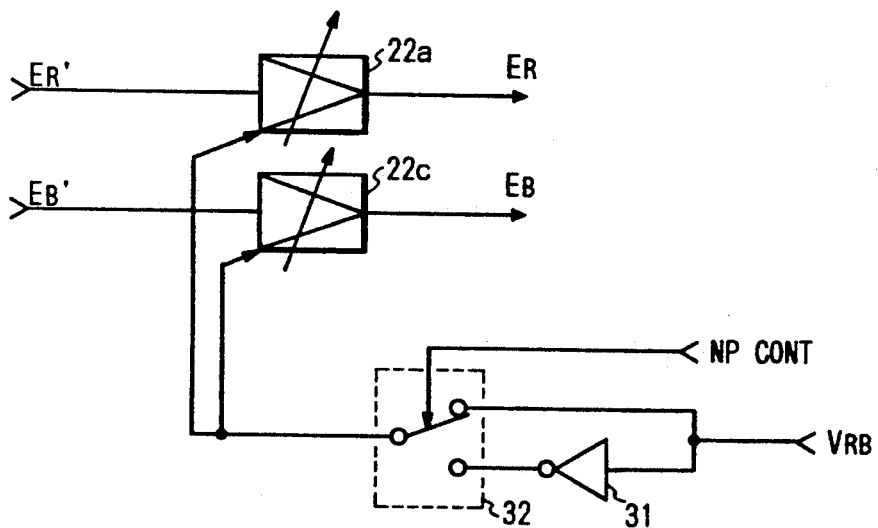
FIG. 10 is a diagram showing a still further modification of the video camera shown in FIG. 6.

FIG. 10 shows a circuit arrangement of a still further modification of the video camera shown in FIG. 6, wherein the single control voltage $V_{RB}$ as shown in FIG. 9 is used and corresponding two control voltages are generated using hardware. A single control voltage inverter 31 and a single control voltage switching unit 32 are connected as shown in FIG. 10. It is necessary that amplifiers 22a and 22c are constructed so as to have the polarities of gain change which are opposite to those of control voltage change.

In the above embodiments, switching between the negative and positive modes is conducted by inverting the luminance signal and color difference signals. The invention is not limited to such signal inversion. For example, a luminance signal and modulated color difference signals (carriers excepting bursts) may be inverted, or color signals $E_R$, $E_G$, and $E_B$ may be inverted. In other words, the present invention is applicable to the case wherein signals are inverted after the stage of variable gain amplifiers for a white balance control and before the stage of outputting a video signal.

As appreciated from the foregoing description of video cameras shown in FIGS. 6 to 10, there are provided inverters for inverting white color balance control signals and switching units for selectively using the inverted and non-inverted control signals between the negative and positive modes. Therefore, a white balance can be adjusted in the same manner for both the negative and positive modes, providing good handling in operation.

I claim:

1. A video camera comprising:
   (a) image pickup means for generating an image signal;
   (b) level changing means for changing the level of said image signal;
   (c) negative-positive switching means for receiving said image signal outputted from said level changing means, said negative-positive switching means outputting said image signal outputted from said level changing means after inverting the polarity of said image signal in a negative mode, and outputting said image signal outputted from said level changing means without inverting the polarity of said image signal in a positive mode; and
   (d) control means for controlling said level changing means such that when in said positive mode, said level changing means increases at least one component of said image signal when said level changing means is adjusted in a first direction and decreases said component of said image signal when said level changing means is adjusted in a second direction and, when in said negative mode, said level changing means decreases said component of said image signal when said level changing means is adjusted in said first direction and increases said component of said image signal when said level changing means is adjusted in said second direction.

2. A video camera according to claim 1, wherein said control means includes control signal generating means for generating a control signal which controls said level changing means and control signal switching means to which said control signal is inputted, said control signal switching means selectively using said control signal with the polarity being inverted and said control signal without the polarity being inverted, between said negative and positive modes.

3. A video camera according to claim 2, wherein said control signal generating means includes an operation member manually operated for adjusting the level of said control signal.

4. A video camera according to claim 2, wherein said control signal switching means includes an inverter to which said control signal is inputted, and a switching circuit for selectively outputting said control signal passed through said inverter and said control signal not passed through said inverter, between said negative and positive modes.

5. A video camera according to claim 2, wherein said control signal switching means comprises a microprocessor.

6. A video camera according to claim 2, wherein said negative-positive switching means includes an inverter to which said image signal outputted from said level changing means is inputted, and a switching circuit for outputting said image signal passed through said inverter in said negative mode, and outputting said image signal not passed through said inverter in said positive mode.

7. A video camera according to claim 1, wherein said image pickup means outputs a plurality of color signals as said image signals, and said level changing means includes a white balance control circuit for controlling a white balance of said plurality of color signals.

8. A video camera according to claim 1, wherein said image pickup means outputs a plurality of color signals as said image signal and said level changing means includes a white balance control circuit which controls a white balance of said plurality of color signals.

9. A video camera comprising:
   (a) image pickup means for generating an image signal;
   (b) level changing means for changing the level of said image signal;
   (c) negative-positive switching means for receiving said image signal outputted from said level changing means, said negative-positive switching means outputting said image signal outputted from said level changing means after inverting the polarity of said image signal in a negative mode, and outputting said image signal outputted from said level changing means without inverting the polarity of said image signal in a positive mode; and
   (d) manual operating means for controlling said level changing means such that when in said positive mode, said level changing means increases at least one component of said image signal when said manual operating means is adjusted in a first direction and decreases said component of said image signal when said manual operating means is adjusted in a second direction and, when in said negative mode, said level changing means decreases said component of said image signal when said manual operating means is adjusted in said first direction and increases said component of said image signal when said manual operating means is adjusted in said second direction.

10. A video camera comprising:
    (a) image pickup means for converting light from a subject into an electrical image signal;
    (b) an iris for limiting said subject image signal incident upon said image pickup means;
    (c) negative-positive switching means for receiving said image signal, said negative-positive switching means outputting said image signal after inverting the polarity of said image signal in a negative mode, and outputting said image signal without inverting the polarity of said image signal in a positive mode; and
    (d) control means for controlling said iris, said control means having a control direction such that, in said positive mode, adjusting said control means in said control direction increases the level of said image signal incident upon said image pickup means, and, when in said negative mode, adjusting said control means in said control direction decreases the level of said image signal incident upon said image pickup means.

11. A video camera according to claim 10, wherein said control means includes control signal generating means for generating a control signal which controls said iris and control signal switching means to which said control signal is inputted, said control signal switching means selectively using said control signal with the polarity being inverted and said control signal without the polarity being inverted, between said negative and positive modes.

12. A video camera according to claim 11, wherein said control signal generating means includes an operation member manually operated for adjusting the level of said control signal.

13. A video camera according to claim 11, wherein said control signal switching means includes an inverter to which said control signal is inputted, and a switching circuit for selectively outputting said control signal passed through said inverter and said control signal not passed through said inverter, between said negative and positive modes.

14. A video camera according to claim 11, wherein said control signal switching means comprises a microprocessor.

15. A video signal according to claim 10 wherein said control means includes automatic control means for automatically controlling said iris in accordance with said image signal and adjusting means for manually adjusting said iris, said adjusting means inverting the adjusting direction between said negative and positive modes.

16. A video camera comprising:
   (a) image pickup means for receiving light from a subject and forming an image signal including a plurality of color signals;
   (b) white balance control means for controlling a white balance of said image signal; and
   (c) negative-positive switching means for receiving said image signal outputted from said white balance control means, said negative-positive switching means outputting said image signal outputted from said white balance control means after inverting the polarity of said image signal in a negative mode, and outputting said image signal outputted from said white balance control means without inverting the polarity of said image signal in a positive mode; and
   wherein, when in said positive mode, said white balance control means increases said white balance of said image signal when said white balance control means is adjusted in a first direction and decreases said white balance of said image signal when said white balance control means is adjusted in a second direction and, when in said negative mode, said white balance control means decreases said white balance of said image signal when said white balance control means is adjusted in said first direction and increases said white balance of said image signal when said white balance control means is adjusted in said second direction.

17. A video camera according to claim 16, wherein said white balance control means includes a plurality of gain control means for controlling the gains for said plurality of color signals, control signal generating means for generating a plurality of control signal for use with said plurality of gain control means, and control signal switching means for receiving said plurality of control signals.

18. A video camera according to claim 17, wherein said control signal switching means includes a plurality of inverters to which said plurality of control signals are respectively inputted, and a plurality of switching circuits for selectively outputting said plurality of control signals passed through said plurality of inverters and said plurality of control signals not passed through said plurality of inverters, between said negative and positive modes.

19. A video camera according to claim 17, wherein said control signal switching means includes a plurality of switching circuits for selectively using said plurality of gain control means to which said plurality of control signals are respectively supplied.

20. A video camera according to claim 17, wherein said control signal generating means includes an operation member manually operated for adjusting the levels of said plurality of control signals.

21. A video camera according to claim 17, wherein said control signal switching means comprises a microprocessor.

22. A video camera according to claim 16, wherein said white balance control means includes a plurality of gain control means for controlling the gains for said plurality of color signals, control signal generating means for generating a control signal for controlling the relative gains of said plurality of gain control means, and control signal switching means to which said control signal is inputted, said control signal switching means selectively using said control signal with the polarity being inverted and said control signal without the polarity being inverted, between said negative and positive modes.

23. A video camera according to claim 22, wherein said control signal generating means includes an operation member manually operated for adjusting the level of said control signal.

24. A video camera according to claim 22, wherein said control signal switching means includes an inverter to which said control signal is inputted, and a switching circuit for selectively outputting said control signal passed through said inverter and said control signal not passed through said inverter, between said negative and positive modes.

25. A video camera according to claim 22, wherein said control signal switching means comprises a microprocessor.

26. An image pickup apparatus comprising:
   (a) an image pickup means for producing an image signal;
   (b) an inverting means for selectively inverting the polarity of said image signal; and
   (c) control means for producing a control signal for controlling said image pickup means to change a level of at least a part of said image signal, wherein the polarity of said control signal is inverted in accordance with a selective inverting operation of said inverting means.

27. An image pickup apparatus according to claim 26, wherein said image pickup means includes exposure control means for controlling an exposure.

28. An image pickup apparatus according to claim 27, wherein said exposure control means includes an iris.

29. An image pickup apparatus according to claim 26, wherein said image pickup means includes gain control means for controlling a level of at least the part of the image signal.

30. An image pickup apparatus according to claim 29, wherein said gain control means controls color balance of said image signal.

31. An image pickup apparatus, according to claim 26, wherein said inverting means includes an inverter and a switch for selecting a signal provided through said inverter and a signal provided not through said inverter.

32. An image pickup apparatus according to claim 26, wherein said inverting means inverts the polarity of said image signal to a predetermined level.

33. An image pickup apparatus according to claim 26, wherein said control means inverts the polarity of said control signal to a predetermined level.

* * * * *

UNITED STATES PATENT AND TRADEMARK OFFICE
CERTIFICATE OF CORRECTION

PATENT NO. : 5,311,322

DATED : May 10, 1994

INVENTOR(S) : Tadashi Okino

It is certified that error appears in the above-indentified patent and that said Letters Patent is hereby corrected as shown below:

On the cover page, after "Filed: Aug. 1, 1991" insert the following:

[30] Foreign Application Priority Data

Aug. 7, 1990 [JP]    Japan. . . . . . . . . 2-207731
    Aug. 9, 1990 [JP]    Japan. . . . . . . . . 2-209197

Signed and Sealed this

Thirty-first Day of October 1995

*Attest:*

BRUCE LEHMAN

*Attesting Officer*    *Commissioner of Patents and Trademarks*